United States Patent Office 3,141,850
Patented July 21, 1964

3,141,850
INSULATING COMPOSITION CONTAINING POLYVINYL CHLORIDE, TRIALLYL CYANURATE, A FILLER, AND A FLAME RETARDANT
Alvin H. Lybeck, Mansfield Center, Conn., assignor to American Enka Corporation, Enka, N.C., a corporation of Delaware
No Drawing. Filed Feb. 28, 1961, Ser. No. 92,176
3 Claims. (Cl. 252—63.5)

The present invention relates to improvements in conductors and more particularly to insulated electrical conductors which are exposed to unusual and severe operating conditions.

The general field of use of these insulated conductors is in aircraft wire and cables and, in fact, any electronic controls for missiles, rockets, and the like. In aircraft wire the weight is one of the critical factors, and the lightest insulation that can be used successfully is not only desirable but in some instances required.

Thermoplastic compositions, such as polyvinyl chloride, progressively soften with increase in temperature, so that their thermal usefulness is limited. In the case of electrical wire, insulating materials are applied concentrically by extrusion around metallic conductors to form a sheath. An electrical overload, which may result, for example, when a circuit breaker malfunctions, may cause the conductor temperature to exceed the thermal yield point of the insulation. When this happens, normal thermoplastic material, such as polyvinyl chloride insulation, will successively soften, melt, and drip off, thereby exposing the bare metallic conductor and inducing the hazard of short-circuiting. In critical applications, such as in aircraft and guided missile use, the over-all reliability is lowered.

It is therefore an object of the present invention to provide a material, such as polyvinyl chloride, with an improved thermoplasticity, i.e., to raise the softening or yield point without detriment to the required dielectric and physical performance properties in the finished product.

A further object is to accomplish the foregoing while utilizing conventional manufacturing processes and equipment which are employed with compositions having normal thermoplasticity.

Another object is to treat polyvinyl chloride in such a way that it does not melt and drip off the conductor as a result of short-circuiting or other electrical overloads, or that such melting and dripping is delayed.

These and other objects are achieved by adding a compatible polymerizable plasticizer to polyvinyl chloride, polyvinyl butyral, cellulose acetate butyrate, cellulose acetate, polyvinyl formal, and the like, and by extruding and depositing the same on a metallic conductor.

Several polymerizable additives were evaluated to establish the most efficient for aircraft wiring and the like, and to select one which offered general advantages over conventional insulating materials for aircraft wire. One of these was an epoxydized soy bean oil plasticizer with pyromellitic dianhydride as the curing agent. The second, which offered the greatest promise, was triallyl cynaurate, and accordingly work was concentrated on this approach. Eventually a composition was developed as follows (parts expressed by weight):

Table I

| | |
|---|---|
| Polyvinyl chloride | 65.0 |
| Dibasic lead phthalate | 5.5 |
| Antimony oxide ($Sb_2O_3$) | 2.0 |
| Dibasic lead stearate | 0.5 |
| Triallyl cyanurate | 22.0 |
| Fumed silica | 5.0 |

Triallyl cyanurate is a reactive, trifunctional alkoxy triazine having a molecular weight of 249 and the structural formula is as follows:

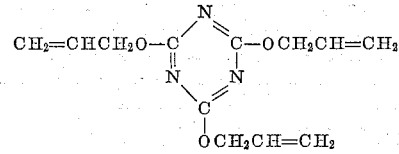

Triallyl cyanurate has a freezing point of 27.3° C., or at about normal room temperature. When used as described herein, it is necessary to warm the material slightly so that it will be in liquid form.

The properties of triallyl cyanurate render it peculiarly adaptable as a plasticizer for polyvinyl chloride as it imparts to the polyvinyl chloride improved heat resistance, as measured in terms of thermal flow of the composition. This makes it especially efficient for the insulation of aircraft wirecraft since melting and dripping of the insulation due to electrical overload can be minimized.

The monomer per se of triallyl cyanurate thereby functions as a plasticizer for polyvinyl chloride conferring extensibility, softness, and processability to the composition. After polymerization of triallyl cyanurate, the composition increases in hardness and toughness and can partially or wholly replace a conventional plasticizer.

Triallyl cyanurate does not polymerize during a normal fabricating operation but will polymerize when subjected to high temperatures. In the oven aging test of this composition, it was shown that elongation dropped sharply after heating at 136° C. for 96 hours, which indicated that polymerization had taken place.

The chemical structure of polyvinyl chloride is totally saturated, which inhibtis the chemical cross linking of continuous macromolecules. It is for this reason that since triallyl cyanurate inherently results in cross linking, it is necessary to add the monomer which is converted to the polymer on applying sufficient heat. This can be done after the insulated wire or other product has been completely manufactured, or it will be polymerized during use in cases where high temperatures are developed, such as in short-circuiting and the like. Apparently, when the triallyl cyanurate polymerizes in the composition, the polyvinyl chloride macromolecules are bound in an unyielding matrix of compatible polymer. No interaction between polyvinyl chloride and triallyl cyanurate takes place and interaction of these materials is not necessary to achieve the improved results.

As stated above, the composition is heat reactive at a temperature level above that normally encountered in processing so that fabrication unit operations, such as milling, extrusion, molding, etc., can be performed without initiating any polymerization. Instead, polymerization of the triallyl cyanurate will take place when supra-normal temperatures are encountered during the useful life of the finished product.

When the composition set forth above in Table I was extruded on #20 AWG stranded tinned copper conductor, it exhibited superior elevated temperature performance and otherwise was generally equivalent to a polyvinyl chloride composition such as that conventionally used for aircraft wire. Such properties as bend at sub-zero temperatures, insulation resistance, abrasion, heat resistance, tensile strength, etc., are required for optimum reliability of aircraft, missiles, and air-borne equipment. The thermal advantage of this composition is shown in current overload studies, and, although it is not a requirement in any existing specification, it has definite advantages over normal polyvinyl chloride insulation. It maintains electrical integrity and functionality to a greater extent than a conventional vinyl insulating material and equals or exceeds the conventional material when the conventional material is strengthened by the addition of a glass overbraid. Moreover, glass braid is objectionable because of the increase in weight imparted to the finished product. This is particularly disadvantageous when used in the aircraft or missile industry, etc.

Wire specimens having normal insulation both with and without glass overbraid and triallyl cyanurate insulation without glass braid were subjected to various degrees of current overload for one hour at 115° C. ambient temperature, and the potential at which breakdown subsequently occurred at room temperature (measured in kilovolts) is set forth in the following Table II.

*Table II*

| Current Overload | Normal Insulation | | Triallyl Cyanurate, without glass overbraid |
|---|---|---|---|
| | Without glass overbraid | With glass overbraid | |
| 100% | 18.2 | 19.9 | 19.9 |
| 120% | 18.3 | 20.5 | 20.6 |
| 140% | 18.8 | 21.2 | 20.6 |
| 160% | 17.1 | 21.6 | 21.6 |
| 180% | 17.2 | 17.0 | 18.9 |
| 200% | 17.0 | 11.6 | 21.2 |
| 220% | 0 | 2.5 | 19.6 |

Lead shot having diameters of 0.04 to 0.08 inch were used as an immersion medium for conducting this dielectric test following overload.

From the above it can be seen that impregnation of the polyvinyl chloride with triallyl cyanurate produces an insulation having a definite improvement over the other two types, particularly from 180% to 220% current overload. All of these wire specimens had an outer sheath of extruded polyamide (hexamethylene diamine-sebacic acid type).

Dielectric values of specimens subjected to high temperature in air also show the superiority of the triallyl cyanurate insulation over the conventional polyvinyl chloride insulation. Cf. the following table. Lead shot again were used as immersion medium for the dielectric test.

*Table III*

| Oven conditioning | Normal polyvinyl chloride insulation, volts | Triallyl cyanurate insulation, volts |
|---|---|---|
| First Series: | | |
| 1 hr. at 430° F | 600 | 1,300 |
| 2 hrs. at 430° F | 0 | 1,200 |
| 1 hr. at 450° F | 0 | 1,400 |
| Second Series: | | |
| 1 hr. at 420° F | 1,300 | 4,500 |
| 1 hr. at 430° F | 500 | 3,000 |
| 1 hr. at 440° F | 0 | 2,700 |
| 1 hr. at 450° F | 0 | 400 |

Triallyl cyanurate can be used with mineral fillers other than the fumed silica specified in Table I. Fumed silica has been shown to impart a maximum reinforcing effect, however, and for that reason is preferred. The function of antimony oxide specified in Table I is to impart flame resistance. Although no catalysts are given in Table I, they can be used under controlled conditions, e.g., metallic salts and peroxides promote polymerization and hydroquinone can be used as a stabilizer.

In addition to its improved heat reactive properties, when polymerized by itself, triallyl cyanurate forms a hard, clear, and somewhat brittle material which is chemically stable up to 230° C. It can react with styrene, methyl methacrylate, or alkyd resins, such as the diethylene glycol-fumaric acid-sebacic acid type. It hydrolyzes readily with dilute or concentrated mineral acids, yielding allyl alcohol and cyanuric acid, but is resistant to alkaline hydrolysis. At temperatures of 160° and higher, the rate of polymerization increases and therefore the polymerization takes place during a shorter time interval. It has excellent stability at 125° C.

Although the utility of the insulated electrical conductor has been described primarily in connection with aircraft wire and cables, it should be understood that it may be used in many applications requiring conductors having improved heat resistance properties and over-all reliability, as well as under unusually hazardous operating conditions. The invention is to be limited only to the extent of the appended claims.

What is claimed is:

1. An article of manufacture comprising an electrical conductor enclosed in a sheath of plastic material consisting essentially of polyvinyl chloride and triallyl cyanurate in the ratio of about 3 to 1.

2. An electrical insulating material formed from about 65% by weight of polyvinyl chloride, about 22% by weight of triallyl cyanurate, a mineral filler, and a flame retardant.

3. A composition of matter consisting essentially of about 65% by weight of polyvinyl chloride, about 22% by weight of triallyl cyanurate, about 5% by weight of fumed silica, about 5.5% of dibasic lead phthalate, about 0.5% of dibasic lead stearate, and about 2% by weight of antimony oxide.

References Cited in the file of this patent

UNITED STATES PATENTS

| 2,590,211 | Rugar | Mar. 25, 1952 |
| 2,907,075 | Newby | Oct. 6, 1959 |

FOREIGN PATENTS

| 540,825 | Canada | May 14, 1957 |